United States Patent
Mittler et al.

(10) Patent No.: US 9,671,019 B2
(45) Date of Patent: Jun. 6, 2017

(54) PISTON RING WITH A PERIODICALLY VARYING GROOVE

(71) Applicant: FEDERAL-MOGUL BURSCHEID GMBH, Burscheid (DE)

(72) Inventors: Richard Mittler, Burscheid (DE); Frank Nathem, Mering (DE)

(73) Assignee: Federal-Mogul Burscheid GmbH, Burscheid (DE)

(*) Notice: Subject to any disclaimer, the term of this patent is extended or adjusted under 35 U.S.C. 154(b) by 0 days.

(21) Appl. No.: 14/441,891

(22) PCT Filed: Sep. 24, 2013

(86) PCT No.: PCT/EP2013/069764
§ 371 (c)(1),
(2) Date: May 11, 2015

(87) PCT Pub. No.: WO2014/072115
PCT Pub. Date: May 15, 2014

(65) Prior Publication Data
US 2015/0300492 A1    Oct. 22, 2015

(30) Foreign Application Priority Data
Nov. 9, 2012 (DE) .................. 10 2012 220 471

(51) Int. Cl.
*F16J 9/20* (2006.01)
(52) U.S. Cl.
CPC ........................ *F16J 9/20* (2013.01)

(58) Field of Classification Search
CPC ...... F16J 9/20; F16J 9/206; F16J 9/203; F16J 9/08; F16J 9/26
See application file for complete search history.

(56) References Cited

U.S. PATENT DOCUMENTS

| | | | | |
|---|---|---|---|---|
| 1,251,906 A | * | 1/1918 | Moratta | F16J 9/20 277/441 |
| 1,401,930 A | * | 12/1921 | Wainwright | F16J 9/20 123/190.17 |
| 1,403,008 A | * | 1/1922 | Carrier | F16J 9/20 277/460 |
| 1,406,763 A | * | 2/1922 | Schoen | F16J 9/20 277/460 |
| 1,613,410 A | * | 1/1927 | Post | F16J 9/203 277/460 |

(Continued)

FOREIGN PATENT DOCUMENTS

DE    10 2009 03624 A1    2/2011

*Primary Examiner* — Kristina Fulton
*Assistant Examiner* — Eugene G Byrd
(74) *Attorney, Agent, or Firm* — Robert L. Stearns; Dickinson Wright, PLLC

(57) ABSTRACT

A piston ring having an outer running face, two flanks and an inner circumferential face is provided, the running face of which has profiling with a groove. The groove is arranged between two running face sections in relation to the cross section of the piston ring. The two running face sections are spaced apart from each other and substantially convexly curved and each have an apex. The groove has a periodically varying depth and a periodically varying width, and the number of periods of the course of the depth and the number of periods of the course of the width are equal.

10 Claims, 4 Drawing Sheets

(56) References Cited

U.S. PATENT DOCUMENTS

| | | | | |
|---|---|---|---|---|
| 1,623,710 | A * | 4/1927 | Teetor | F16J 9/20 277/464 |
| 1,636,027 | A * | 7/1927 | Walter | F16J 9/20 277/464 |
| 1,755,402 | A * | 4/1930 | Magee | F16J 9/20 277/463 |
| 2,131,970 | A * | 10/1938 | Ritz | F16J 9/20 277/461 |
| 2,554,289 | A * | 5/1951 | Anderson | F16J 9/20 277/444 |
| 3,735,992 | A * | 5/1973 | Prostorov | F16J 9/28 277/464 |
| 3,811,691 | A * | 5/1974 | Sugahara | F16J 9/20 277/441 |

\* cited by examiner

Circumferential direction/angle

Circumferential direction/angle

PISTON RING WITH A PERIODICALLY VARYING GROOVE

BACKGROUND OF THE INVENTION

1. Technical Field

The present invention relates to a piston ring for an internal combustion engine or for a compressor, in particular a piston ring having a groove that is arranged on the running face and has a periodically varying width and a varying, variable depth in the circumferential direction.

2. Related Art

Modern, large-volume engines for ships are still two-stroke diesel engines, since this type of engine can be designed in such a manner that the speed thereof is typically in a range from approximately 50 rpm to 250 rpm (typically less than 100 rpm) and the power thereof can reach up to approximately 100 MW, depending on the number of cylinders. Such large-volume, slow-running two-stroke ship engines preferably act directly on the drive shaft(s) of the propeller(s), since a reduction gear to reduce the rotation speed can be omitted owing to the speed of said engines.

Such large-volume two-stroke engines typically have two separate oil circuits, one for engine lubrication and one for cylinder lubrication. Cylinder lubrication ensures that enough lubricant is provided at a suitable point in time to guarantee sufficient lubrication of the cylinder surfaces and piston rings.

The cylinder lubricant is injected through the liner into the piston chamber, depending on the load of the machine. The piston rings run on this lubricating film, the supporting surface. Here it is a matter inter alia of injecting as little lubricant as possible in order to save costs and prevent over-lubrication. Cylinder lubrication takes place for example in the upper third of the stroke, by supplying lubricant by means of a lubricant pump through lubricant inlets, which are for example provided in a plane in the cylinder wall, into the cylinder so that the lubrication of the piston and of the piston ring is ensured in as optimal a manner as possible. The oil supply into the cylinders usually takes place using the gas counter pressure method.

For example, a lubricant injection system can be used that injects lubricant into the cylinders via nozzles in a precisely metered manner. A computer-controlled system registers the position in which a piston is located and then supplies lubricant in a targeted manner. This takes place at high pressure, so that the lubricant is sprayed very finely in order to obtain the most uniform possible wetting of the cylinder liner, but targeted to where the piston rings are and where the friction actually takes place.

If one considers that modern, large-volume two-stroke ship engines are operated at a speed of approximately 50 rpm to 250 rpm with a stroke of up to 2500 mm, the time span available for the supply of the lubricant and the distribution of the supplied lubricant is short and presents great challenges in ensuring the quality of the lubrication. If one assumes for example that a cylinder has an (inner) diameter of 900 mm and 8 inlets for the oil supply are provided distributed uniformly around the circumference of the cylinder wall, the supplied lubricant must be distributed in the circumferential direction over a length of approx. 350 mm starting from the respective inlets in the time span available.

SUMMARY OF THE INVENTION

It has been found that with a conventional design of the one or more piston rings no or only a very low distribution of the lubricant in the circumferential direction (maximum approx. 3%) is obtained, owing to insufficient pressure gradients in the circumferential direction.

The field of use of the present invention is the field of internal combustion engines generally, including those not on ships.

The object of the present invention is to provide a piston ring that ensures low oil consumption and lower blow-by with sufficient lubricating conditions and can be produced inexpensively.

According to the invention, a groove is arranged on the running face of a piston ring between two substantially convexly curved running face sections. The groove has a periodically varying depth course and a periodically varying width course in the circumferential direction.

The running face of the piston ring formed in this manner can receive lubricant in a cavity that is formed by the groove and a counter running face. The periodically varying depth course and the periodically varying width course of the groove causes hydrodynamic pressures to build up or arise (in particular varying periodically with the depth course and width course) in the circumferential direction during operation. Said hydrodynamic pressures result in pressure gradients, leading to lubricant flows and a circumferential distribution of the lubricant. The hydrodynamically effected circumferential distribution of the lubricant results in a reduction in the amount needed and a more uniform distribution, in relation to the circumferential direction, of the lubricant supplied or injected into the groove.

A supporting surface of lubricant that is uniform in relation to the circumference is thus obtained as desired in order to ensure sufficient lubricating conditions, to seal off as uniformly as possible from blow-by (or to obtain the lowest possible blow-by), to strip off the lubricant effectively in the working direction of the piston and to allow over-running.

Advantageous embodiments of the present invention are contained in the sub-claims.

THE DRAWINGS

The invention is explained in more detail below using the exemplary embodiments shown in the drawings, in which FIGS. 1(a) and 1(b) show a first (radial) cross section and a second (radial) cross section through a piston ring according to one embodiment of the present invention;

FIG. 2(a) shows a plan view of a detail of the running face, running in the circumferential direction, of the piston ring according to the piston ring according to the invention shown in FIG. 1;

FIGS. 2(b) and 2(c) show a course of the depth profile or depth of the groove arranged in the running face according to the detail of the running face, running in the circumferential direction, of the piston ring shown in FIG. 2(a);

Figure 3A:
Figure 4A:
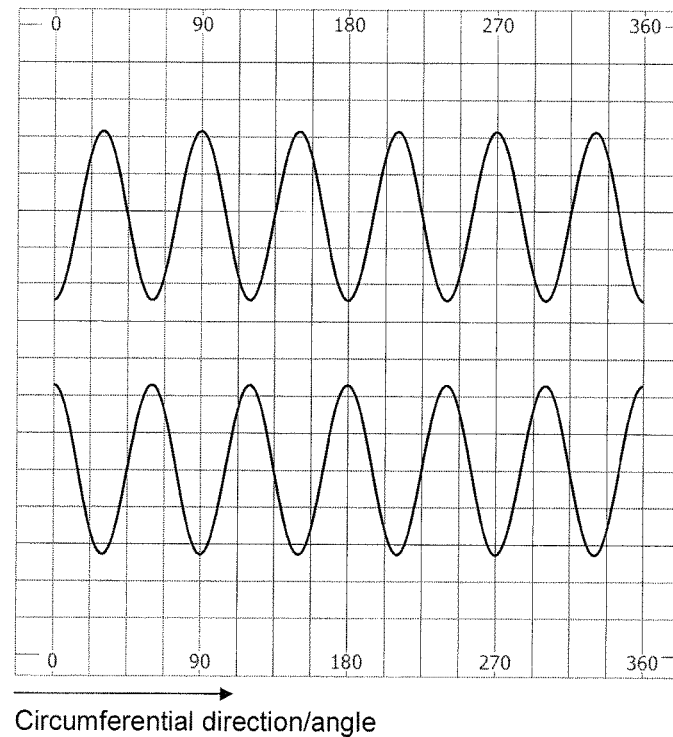
Figure 4B:
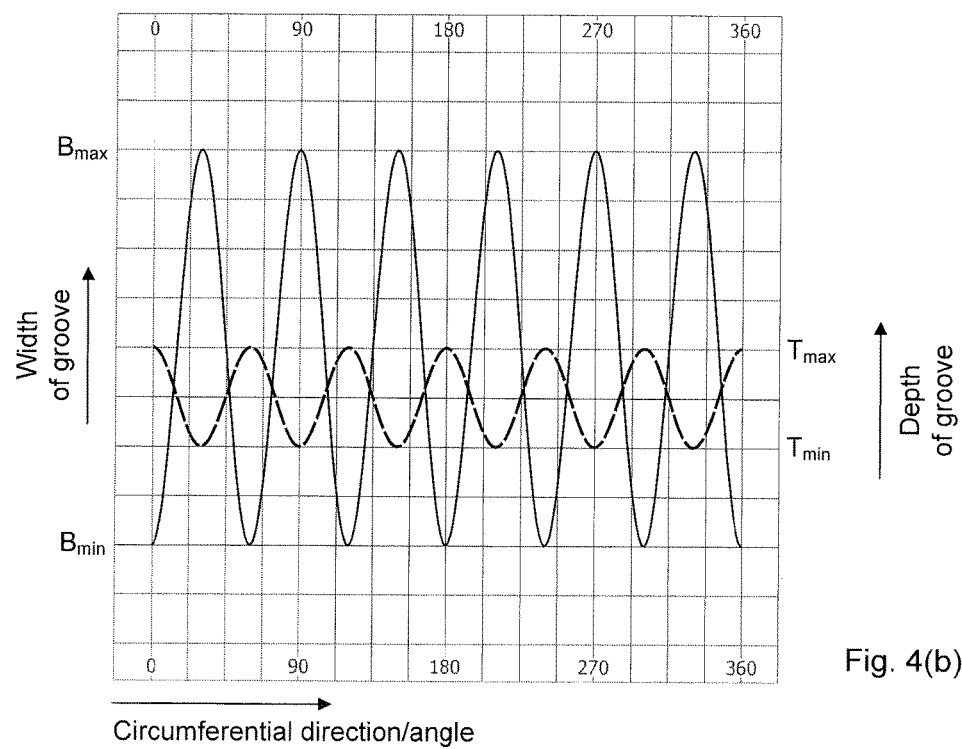

FIGS. 3(a) and (b) show perspective detail views and cross-sectional views of a piston ring of a further embodiment according to the invention; and FIGS. 4(a) and 4(b) show exemplary functionally described courses of the groove and the depth and width thereof according to a further embodiment of the present invention.

DETAILED DESCRIPTION

Figure 1:
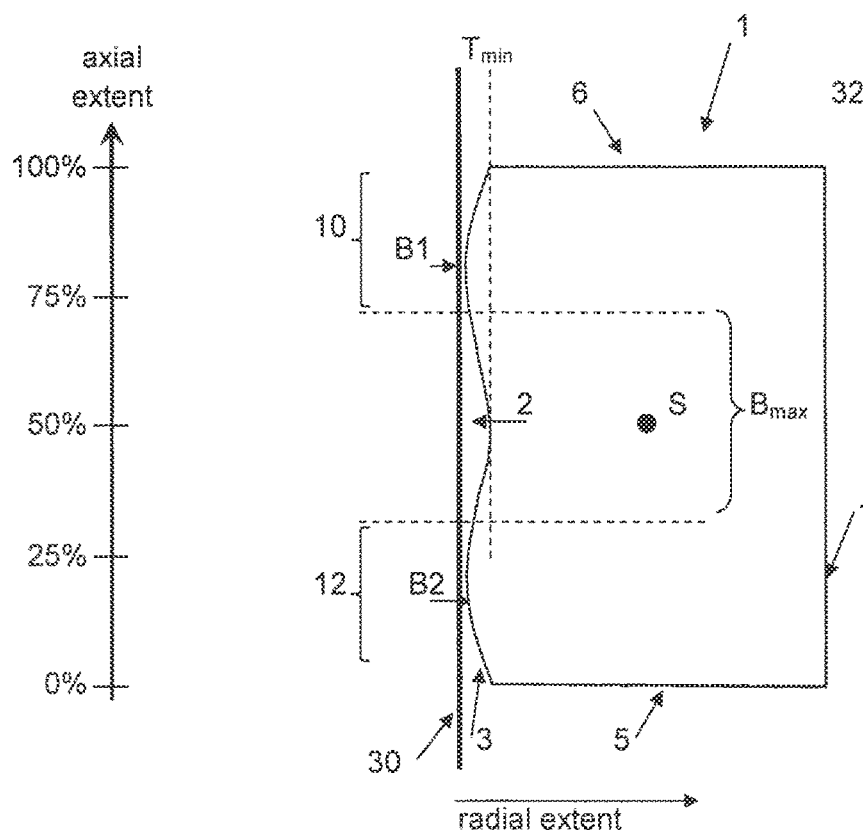
Figure 1:
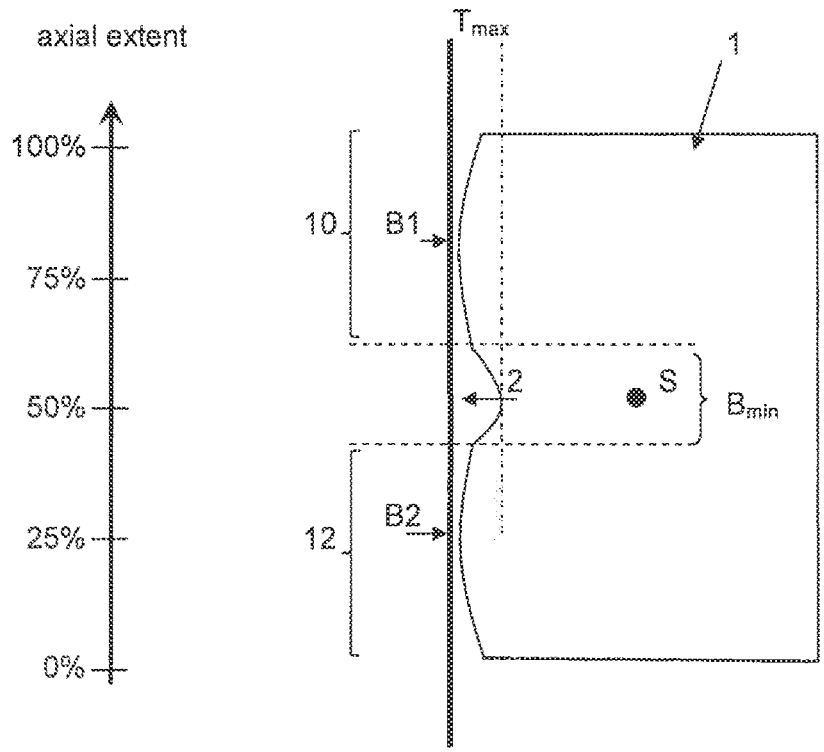

FIG. 1 shows two (radial) cross sections, which are spaced apart from each other in the circumferential direction, through a piston ring 1 according to the invention. The piston ring 1 according to the invention, which is shown in FIG. 1 and preferably acts as a compression and oil control ring at the same time, with a groove has a cut-out or groove 2 on its outer, profiled side that faces away from the combustion chamber, i.e. on the profiled running face 3 of the piston ring 1, said groove being illustrated schematically in FIG. 1. The piston ring 1 also has a flank 5 that faces the combustion chamber 31, a flank 6 that faces the oil chamber 32, and an inner circumferential face 7.

It should be noted that, although the description above and below relates to the use of the piston ring 1 according to the invention for a piston in an internal combustion engine, in particular in a two-stroke internal combustion engine, it is immediately clear to a person skilled in the art that a piston ring according to an embodiment according to the invention can also be used in compressors.

The running face 3 has a profile, which is divided into two sections. The first section 10 of the running face profile is substantially convexly curved and the second section 12 is likewise substantially convexly curved. The two convexly curved sections 10, 12 each have an apex B1, B2 or each have an apex line 11, 13 that runs along the outer circumference in cross section.

The running face profiles of the two convexly curved sections 10, 12 are preferably symmetrical (mirror-symmetrical) in relation to the centre plane of the piston ring 1, as shown in FIGS. 1(a) and 1(b). It should however be understood that the present invention is not limited to a symmetrical configuration of the two convexly curved sections 10, 12, but that the running face profiles of the two convexly curved sections 10, 12 can be symmetrical (mirror-symmetrical) in relation to a plane parallel to the centre plane or asymmetrical.

The first convexly curved section 10 of the running face profile is preferably formed in a range of 0% to 33% of the axial extent of the running face 3 of the piston ring 1 and the apex B1 of the first convexly curved section 10 is further preferably substantially approximately 25%±5% of the axial extent of the running face 3 of the piston ring 1.

The second convexly curved section 12 of the running face profile is preferably formed in a range of 66% to 100% of the axial extent of the running face 3 of the piston ring 1 and the apex B1 of the first convexly curved section 10 is further preferably substantially approximately 75%+5% of the axial extent of the running face 3 of the piston ring 1.

In the region of the apex lines 11, 13 running in the circumferential direction, the piston ring 1 seals in relation to a counter running face 30 such as a cylinder liner to prevent blow-by from the combustion chamber 31. The piston movement causes a hydrodynamic oil film to form between the piston ring 1 and the counter running face 30, said oil film forming between the piston ring 1 and the counter running face 30 owing to the piston movement and ensuring sufficient lubrication between said parts. In the cross-sectional views, the apex lines 11, 13 running in the circumferential direction are shown as apices B1, B2.

A cut-out or groove 2 extends between the convexly curved sections 10, 12. The groove 2 has a width B that varies in the circumferential direction and a depth T that varies in the circumferential direction. FIG. 1(a) schematically shows a first (radial) cross section through the groove 2 with a maximum width $B_{max}$ and a minimum depth $T_{min}$ and FIG. 1(b) schematically shows a second (radial) cross section through the groove 2 with a minimum width $B_{min}$ and a maximum depth $T_{max}$.

It should be noted that the cut-out or groove 2 is provided to receive lubricant. The varying depth T and the varying width B of the groove 2 are designed in such a manner that a preferably uniform flow of the lubricant situated in the groove in the circumferential direction is obtained owing to hydrodynamic pressures occurring during operation of the piston and the resulting pressure gradients. In particular the peaks (lower or minimum depth) and troughs (larger or maximum depth) formed in an alternating manner by the varying depth course in the circumferential direction cause the hydrodynamic pressures and pressure gradients and ensure a uniform lubricant flow.

It should also be noted that the piston ring 1 according to the invention is in one piece. This means that the groove 2 in the piston ring 1 has a maximum depth $T_{max}$ that is less than the radial extent of the piston ring 1, so that it is not possible for lubricant to pass through the piston ring 1 in the direction of the inner circumferential face 7.

The centroid S of the cross section of the piston ring 1 lies in a plane between the two apices B1 and B2 in relation to the axial extent of the running face 3 of the piston ring 1. This ensures that the piston ring 1 in the static state bears against the counter running face 30 with the two apices B1 and B2 and may be minimally spaced apart from said counter running face by a thin oil film (not shown) situated therebetween.

Figure 2A:
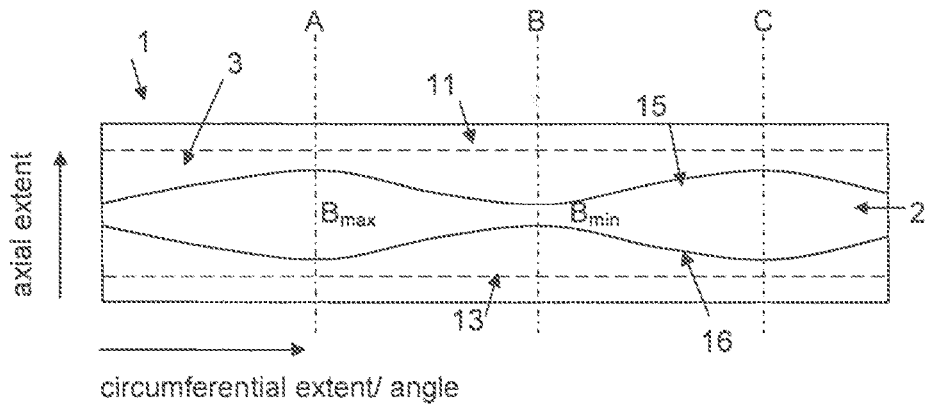
FIG. 2(d) shows a course of the width of the groove arranged in the running face according to the detail of the running face, running in the circumferential direction, of the piston ring shown in FIG. 2(a)
FIG. 2(e) shows a plan view of the plane of the piston ring 1

FIG. 2(a) shows a plan view of a detail of the running face 3, running in the circumferential direction, of the piston ring 1 according to the invention. In the detail of the running face 3 shown, the width course of the groove 2 and the two apex lines 11, 13 are shown schematically. The width B of the groove 2 varies between a maximum width $B_{max}$ and a minimum width $B_{min}$. At circumferential positions A and C, the groove 2 has the maximum width $B_{max}$, while at circumferential position B, the groove 2 has the minimum width $B_{min}$.

The groove 2 is indicated in FIG. 2(a) using two outer boundary lines 15 and 16, which delimit the groove and with the aid of which the width of the groove 2 can be determined. In FIG. 2(a), section positions A, B and C are also shown. The cross-sectional view shown in FIG. 1(a) is obtained with a section at position A or C, while the cross-sectional view shown in FIG. 1(b) is obtained with a section at position B.

Figure 2B:
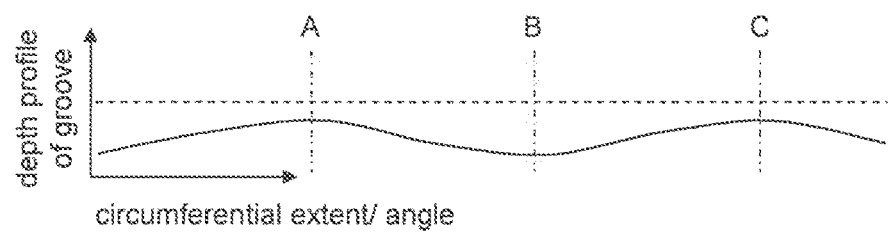
Figure 2C:
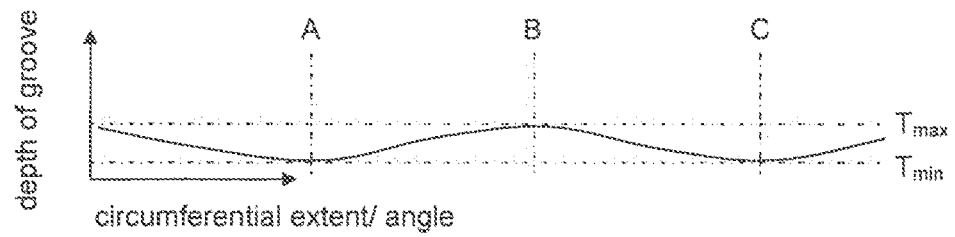

FIGS. 2(b) and 2(c) show the depth profile or course of the depth T of the groove 2 according to the detail of the running face 3 with the groove 2 shown in FIG. 2(a). The depth T of the groove 2 varies between a minimum depth $T_{min}$ and a maximum depth $T_{max}$. The course of the width B of the groove 2 and the course of the depth profile of the groove 2 are in phase. This means that when the groove 2 has the maximum width $B_{max}$, the groove 2 is formed with minimum depth $T_{min}$, and when the groove 2 has the minimum width $B_{min}$, the groove 2 is formed with maximum depth $T_{max}$. In the depth profile course shown in FIG. 2(b), the circumferential positions A, B and C are shown correspondingly and the in-phase course of the width and the depth profile of the groove 2 is illustrated.

Figure 2D:
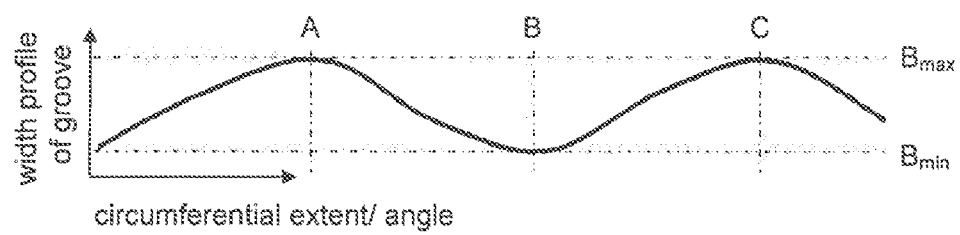
Figure 2E:
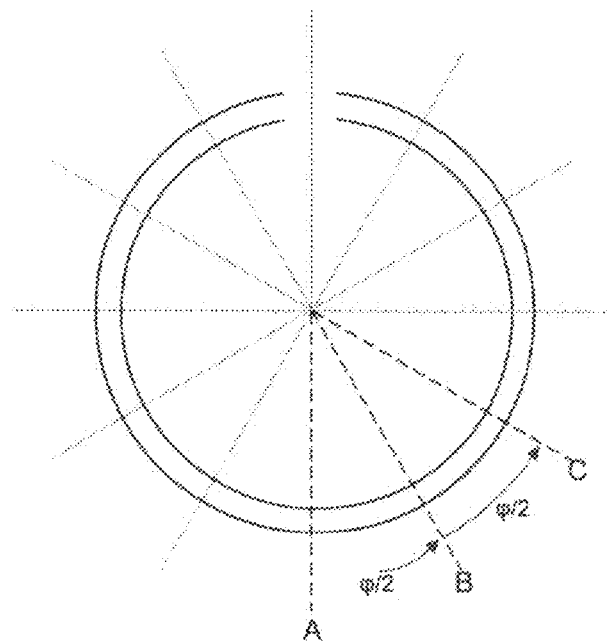

FIG. 2(d) shows a view of the plane of the piston ring 1. The circumferential positions and sectional positions A, B and C shown in FIGS. 2(a), 2(b) and 2(c) are shown in the piston ring plane. The width and the depth of the groove 2 in the running face 3 of the piston ring 1 vary periodically along the outer circumference of the piston ring 1. FIG. 2(d)

shows a periodicity of 6 by way of example. This means that the period angle in relation to the piston ring circumference is ϕ=60° in the exemplary embodiment shown. The periods of the variations in the width B and the depth T of the groove 2 preferably lie in a range from 4 (ϕ=90°) to 36 (ϕ=10°) inclusive. The periods are preferably of integral and in particular equal number.

The circumferential positions and sectional positions A, B and C as shown in FIGS. 2(*a*), 2(*b*), and 2(*c*) are shown in the polar coordinate system. FIG. 2(*e*) shows the sections A, B and C by way of example. This means that the period angle in relation to the piston ring circumference is Ø2=30° in the exemplary embodiment shown.

It should be noted that the number of periods for the depth and the width of the groove 2 can be matched to the number of inlets or nozzles through which the lubricant is pressed or injected into the cylinder, for example using the gas counter pressure method. For example, the number of periods can be equal to the number of inlets or nozzles or else be an integral multiple thereof.

Figure 3B:
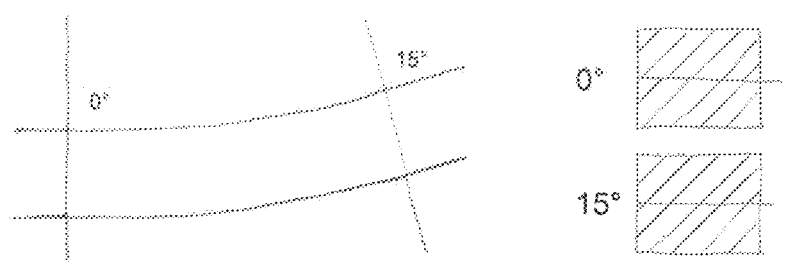

A further exemplary embodiment according to the invention of the piston ring 1 is shown in FIGS. 3(*a*) and 3(*b*). The period angle is ϕ=30° in this example.

The groove 2 can be symmetrical, i.e. mirror-symmetrical as shown in FIGS. 1 and 2 or else asymmetrical in relation to the centre plane of the piston ring 1 (not shown). The groove 2 runs substantially centrally, i.e. the groove runs substantially centrally in relation to the axial extent of the piston ring 1 and in relation to the centre plane of the piston ring 1, as shown in FIGS. 1 and 2 (at substantially 50% of the axial extent). Alternatively, the groove 2 can also be arranged outside the centre plane of the piston ring 1.

The apex lines 11 and 13 preferably lie substantially on circles, the planes of which are parallel to the plane of the piston ring 1; cf. FIG. 2(*a*). Alternatively, at least one of the apex lines 11 and 13 can also follow the course of the width of the groove 2 at a distance or identically. For instance, the apex lines 11 and 13 can be identical to the outer boundary lines 15 and 16 of the groove 2. This means that the width of the groove 2 is defined by the distance between the apex lines 11 and 13 of the two sections 10 or 12.

The width B and the depth T of the groove 2 are preferably constant and can also preferably be described in each case by periodic, constant functions. In particular, the width B and the depth T of the groove 2 can be described in each case by periodic, differentiable functions. This means that for example the boundary lines 15 and 16 can be described by angle functions, for example, as a function of the circumferential angle ϕ and the number of periods k:

$$F_1(\varphi) = +\frac{B_{max} - B_{min}}{4} \cdot \cos(k \cdot \varphi)$$

$$F_2(\varphi) = -\frac{B_{max} - B_{min}}{4} \cdot \cos(k \cdot \varphi) + \frac{B_{max} + B_{min}}{2}$$

The width B and the depth of the groove 2 can likewise be expressed by angle functions, for example as follows:

$$B_1(\varphi) = F_2(\varphi) - F_1(\varphi) = -\frac{B_{max} - B_{min}}{2} \cdot \cos(k \cdot \varphi) + \frac{B_{max} + B_{min}}{2}$$

$$T(\varphi) = -\frac{T_{max} - T_{min}}{2} \cdot \cos(k \cdot \varphi) + \frac{T_{max} + T_{min}}{2}$$

The exemplary functions above are shown for better understanding in FIGS. 4(*a*) and 4(*b*).

The piston ring proposed in the present application is in particular for pistons in a system having a diameter of more than 400 mm.

A piston ring formed according to the present invention can preferably be inserted into a piston ring groove in pistons for internal combustion engines such as large-volume two-stroke internal combustion engines or compressors. It has been found that both oil consumption and blow-by can be greatly reduced compared to known configurations. It should therefore be noted that, with a piston ring according to the invention, a piston ring for pistons of an internal combustion engine or compressor is created in both design and production terms that achieves outstanding results with regard to blow-by and oil consumption while ensuring sufficient lubrication conditions.

According to a further aspect of the invention, it is provided for the groove to have a periodically varying position.

According to one exemplary embodiment, the following physical values are provided: 600 mm ring, groove width 1-3 mm (axial height 16 mm), groove depth 0.2-0.7 mm (radial wall thickness 19.5 mm).

The invention claimed is:

1. A piston ring having an outer running face, two flanks and an inner circumferential face, the running face having profiling with a groove,
    the groove being arranged between two running face sections in relation to the cross section of the piston ring,
    the two running face sections being spaced apart from each other and substantially convexly curved and each having an apex, wherein the groove has a periodically varying depth and a periodically varying width, and
    the number of periods of the course of the depth and the number of periods of the course of the width are equal, and further wherein the groove has maximum depth at minimum width and minimum depth at maximum width.

2. The piston ring according to claim 1, wherein the number of periods of the depth course and the number of periods of the width course are integral.

3. The piston ring according to claim 1, wherein the groove has a center which is substantially central in relation to the apex lines of the two running face sections.

4. The piston ring according to claim 1, wherein the two substantially convexly curved running face regions are arranged symmetrically in relation to the axial extent of the piston ring.

5. The piston ring according to claim 1, wherein the groove is substantially symmetrical if the running face of the piston ring is viewed from above.

6. The piston ring according to claim 1, wherein the groove is substantially asymmetrical if the running face of the piston ring is viewed from above.

7. The piston ring according to claim 1, wherein the groove is substantially concave in the running face of the piston ring.

8. The piston ring according to claim 1, wherein the apices of the two running face sections lie substantially in the same radial plane parallel to the plane of a counter running face.

9. The piston ring according to claim 1, wherein the number of periods of the depth course and the width course lies in a range between 4 and 36 inclusive.

10. The piston ring according to claim 3, wherein the center of the groove run centrally in relation to the axial extent of the piston ring.

\* \* \* \* \*